United States Patent [19]

Thomson

[11] Patent Number: 4,678,916
[45] Date of Patent: Jul. 7, 1987

[54] DOSIMETER

[75] Inventor: Ian Thomson, Nepean, Canada

[73] Assignee: Thomson & Nielsen Electronics Ltd., Kanata, Canada

[21] Appl. No.: 827,509

[22] Filed: Feb. 10, 1986

[30] Foreign Application Priority Data

Sep. 18, 1985 [CA] Canada .................................. 491,034

[51] Int. Cl.[4] .............................................. G01T 1/24
[52] U.S. Cl. ................................................... 250/370
[58] Field of Search ........... 250/370 F, 370 K, 370 C, 250/370 R, 371

[56] References Cited

U.S. PATENT DOCUMENTS

4,213,045 7/1980 Fraass et al. ..................... 250/370 F
4,484,076 11/1984 Thomson ........................ 250/370 F Primary Examiner—Carolyn E. Fields
Attorney, Agent, or Firm—Edward E. Pascal

[57] ABSTRACT

The invention is a radiation dosimeter and method of operation of its elements comprising a pair of silicon insulated gate field effect transistors integrated into the same substrate, each having a gate, a source and a drain. The dosimeter includes apparatus for measuring a first differential threshold votlage between the transistors, appartus for forward biasing the gate of the first transistor and inhibiting operation of the second, while allowing both to be subjected to ionizing radiation, and apparatus for measuring a second differential threshold voltage between the transistors following the irradiation. The first differential threshold voltage can be subtracted from the second to obtain a measure of the radiation dosage. Threshold drift and offset is thereby substantially eliminated.

24 Claims, 17 Drawing Figures

DOSIMETER

This invention relates to a dosimeter for measuring ionizing radiation and particularly to a dosimeter using an insulated gate field effect transistor (IGFET) as a sensor, having substantially improved accuracy.

IGFET sensors have previously been used in ionizing radiation dosimeters. It had been found that radiation shifted the threshold voltage of the IGFET; in order to determine the amount of radiation dose received, the amount of shift of the threshold voltage was measured.

The theory behind the use of IGFETs as sensors in dosimeters, and an operational dosimeter have been described in the papers "RADIATION DOSIMETRY WITH MOS SENSORS" by I. Thomson, R. E. Thomas and L. P. Berndt, "RADIATION PROTECTION DOSIMETRY", Volume 6, No. 1—pp 121-124, December 1983, and "NEW DIRECT READING SOLID STATE DOSIMETER" by I. Thomson given at the 28th Annual Meeting of the Health Physics Society, June 1983, Baltimore, Maryland, U.S.A.

In this specification, the term IGFET refers to a field effect transistor fabricated on a silicon substrate and having an oxide insulator between the gate electrode and the silicon substrate. The gate electrode can be either metal or polycrystalline silicon dioxide.

In use of such IGFETs, a number of problems have been recognized. The threshold voltage has been found to vary with temperature, i.e. approximately $-2$ mV/°C. With no temperature compensation, a 1° C. shift in temperature has been found to cause an approximately error of 1 rad. In military applications, dosimeters are typically required to cover the temperature range $-20°$ C. to $+50°$ C., a 70° difference, which would give rise to a 70 rad error. Due to the large error, use of the system described earlier in which the threshold voltage shift is measured to define received dosage has been found to be unfeasible in practice where wide temperature ranges are expected to be encountered.

Such devices also have an inherent zero offset which varies from device to device and from wafer to wafer. For example, the threshold voltage at zero dose has been found to average approximately 5 volts. However even if the threshold voltage was controlled to 10%, this would be insufficient to give all devices the same threshold voltage. In volume, 10% threshold voltage is considered to be as good as is practically possible for volume production. However this represents approximately 500 millivolts variation, or approximately 250 cGy error. This error has been found to be too great a spread for sensors in the 10 cGy to 1,000 cGy range. The previous solution to this problem was to offset each device individually with a resistor or to measure, record and calculate the zero offset using a computing device.

A third problem associated with such prior art devices is zero drift in the threshold voltage, in addition to the temperature effect. This phenomenon has been found to be reproducible and occurs on switching on a P-channel IGFET. The phenomenon is believed to be due to slow surface states in the silicon/silicon dioxide interface. This drift has been measured as typically 10-20 mV maximum, and is a drift in the same voltage direction (i.e. the threshold voltage increases by 10-20 mV).

The present invention is a radiation dosimeter which uses an IGFET sensor, which substantially overcomes the aforenoted problems to an extent that a substantially improved and practical dosimeter results. Both indirect and direct reading dosimeters can be fabricated, useful by the military, for example, both as personal and tactical dosimeters. Such dosimeters operate in the range of 10-1,000 cGy (gamma+neutron) in the temperature range noted earlier.

The present invention solves the problems of drift, whichever of the cause noted above, by measuring the differential threshold between two IGFET sensors exposed to the same radiation, in which one is biased into its conducting region, and the other is biased either off or to a conducting level less than the first. Since slow surface states and temperature affect both IGFETs in the same manner, the drift will proceed substantially the same, and any differential resulting from the drift will be zero or minimized. However since one of the IGFETs is biased either off or to a conducting level less than the first, the threshold voltage of the first transistor varies with the dosage to a greater degree than that of the second IGFET. Thus the measured differential threshold voltage between the two transistors will be a measure of the gamma radiation dose.

It should be noted that the reading of the radiation dose is effected with the gates of each of the transistors connected to their drains, and with equal currents passing through their drain-source circuits. Thus because the differential threshold voltage is measured, the effect of zero offset is also eliminated.

In order to ensure as closely as possible that both transistors would have the same threshold change with temperature, the same drift, and the same offset, it is desired that both transistors should be fabricated in the same silicon substrate, i.e. in the same die. Preferably the gate oxide should be greater than or equal to 0.5 microns, and preferably is P-channel. It is also preferred that a polysilicon gate should be used. However it should be noted that metal gate devices could be used, as well as N-channel field effect transistors.

In spite of the above precautions, it may be found that there remains a threshold difference between the two transistors. Thus prior to irradiation, it is preferred that the differential threshold between the two IGFETs should be measured. After irradiation, and measurement of the differential threshold, the first differential threshold can be subtracted from the second differential threshold, to obtain an accurate dosage measurement.

As a further alternative, a resistor can be connected in series with the source-drain circuits of each of the transistors, which can be varied (e.g. by laser trimming) to precisely equalize the threshold voltages, i.e. to cause the differential threshold voltage to be zero.

According to a further embodiment of the invention, each transistor is replaced by a cascade of source-drain connected transistors, in order to increase the sensitivity.

In another embodiment, four IGFETs are connected as a bridge, which doubles the sensitivity of the two transistor embodiments, allows the use of only one current source as opposed to two during measurement of the dose, and allows use of the same gate bias during irradiation as in the dual IGFET embodiment.

During irradiation, in one embodiment, the gate of the second transistor of the dual IGFET pair is connected to zero volts (e.g. to its own drain). In another embodiment, however, it is given a voltage bias, which is in the same polarity direction but lower value as the first IGFET. This embodiment has been found to minimize sensitivity difference between the two IGFETs.

Once the first IGFET has received sufficient radiation to saturate it, the second IGFET can merely replace it, and the saturated IGFET be used as the second IGFET. This can be accomplished by the use of switches or by a simple connector which is reversed in position, and which may be permanently fixed to the substrate or base carrying the IGFETs. This allows the dosimeter to have twice the dosage range of a dosimeter which uses a single IGFET.

Thus by the use of at least two IGFETs in the sensor, not only is the dosage range doubled, but the problems of voltage drift with temperature or due to slow surface states and zero offset are substantially reduced or eliminated.

In basic form, the invention is a radiation dosimeter and method of operation of its elements comprising a pair of silicon insulated gate field effect transistors integrated into the same substrate, each having a gate, a source and a drain. The dosimeter includes apparatus for measuring a first differential threshold voltage between the transistors, apparatus for forward biasing the gate of the first transistor and inhibiting operation of the second, while allowing both to be subjected to ionizing radiation, and apparatus for measuring a second differential threshold voltage between the transistors following the irradiation. The first differential threshold voltage can be subtracted from the second to obtain a measure of the radiation dosage.

A better understanding of the invention will be obtained by reference to the detailed description below, in connection with the following drawings, in which.

Figure 1A:
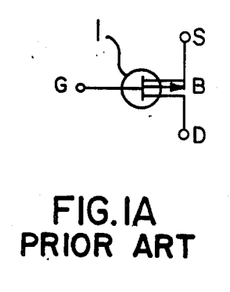
FIGS. 1A, 1B and 1C respectively illustrate schematic diagrams of a IGFET, an IGFET in a circuit ready for irradiation, and in a circuit for measurement of its threshold, all according to the prior art.

Turning now to FIG. 1A, an IGFET is shown of the kind used in the present invention. The IGFET is preferably an MOS field effect transistor using either a metal gate or silicon gate, having source, drain and gate terminals, and is preferably of P-channel type. The gate oxide is preferably 0.5 microns or greater in order to operate suitably. The body or substrate of the device is connected to the source.

Figure 1B:
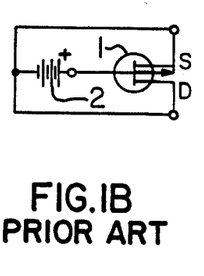

In FIG. 1(B), battery 2 is shown connected to the IGFET 1 as in the prior art, with its positive pole connected to the gate and its negative pole connected to both the source and drain terminals. The device is now connected in a circuit whereby it can be exposed to radiation. The threshold of operation moves in the negative direction for both P-channel or N-channel devices.

Figure 1C:
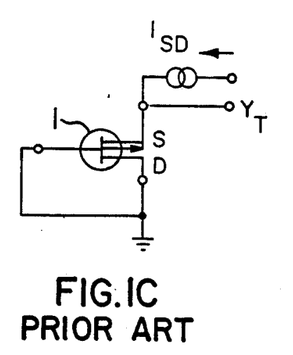

In FIG. 1(C), the same IGFET 1 which was shown in FIG. 1(B) is connected with its gate connected to its drain, and a current source $I_{SD}$ connected to the source as in the prior art. The threshold voltage $V_T$ is measured across the source and drain. The threshold which is measured provides a determination of the dose received by the IGFET.

As noted earlier, the prior art dosimeter described above suffers from variation in threshold voltage with temperature, drift of threshold and zero offset.

Figure 2:
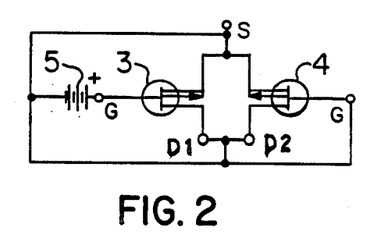
FIG. 2 is a basic circuit according to the present invention in its form prepared for irradiation.

FIG. 2 illustrates the basic embodiment of the present invention. Two IGFETs 3 and 4 have their sources connected together at S and their drains D1 and D2 connected together, with a battery 5 or other device to provide bias potential connected between the gate of IGFET 3 and its drain D1 and source S, the gate of IGFET 4 connected to its drain D2. Both IGFETs are of the same type, similar to the IGFET 1 of FIG. 1, but are fabricated in the same die in order that they should have the same temperature variation characteristics, the same substrate resistivity and the same slow surface states prior to irradiation. Preferably the gate oxide of each IGFET should be greater or equal to approximately 0.5 microns, i.e. is a thick oxide IGFET.

Both IGFETs shown in FIG. 2 are subjected to the same ionizing radiation. It has been found that more charge will accumulate under the gate of biased IGFET 3 compared with that of IGFET 4, shifting its threshold.

Figure 3:
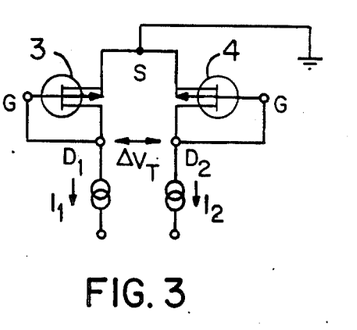
FIG. 3 is a circuit according to the present invention prepared for measurement of dosage.

FIG. 3 illustrates the same IGFETs 3 and 4 in a circuit prepared in order that the dosage can be read. The sources of the IGFETs are connected together but the drains are not. The gate of IGFET 3 is connected to its own drain D1 and the gate of IGFET 4 is connected to its own drain D2. A source of D.C. or A.C. current $I_1$ is connected to drain D1 and a source of D.C. or A.C. current $I_2$ is connected to drain D2. Both sources of current pass through the common source, thereby causing current $I_1$ to pass through IGFET 3 and current $I_2$ to pass through IGFET 4. Both currents are the same value.

The voltage $\Delta V_T$ is measured across the drains D1 and D2. This is the differential threshold voltage, and will be found to be a relatively accurate representation of the dosage received, with temperature and surface state drift as well as zero offset substantially cancelled out.

In case there is a difference between the thresholds of both transistors 3 and 4 prior to irradiation, the circuit of FIG. 3 is set up prior to irradiation, and the voltage $\Delta V_T$ measured as a first differential threshold. The circuit of FIG. 2 is then set up and the IGFETs irradiated. In order to read the accumulated dose, the circuit of FIG. 3 is then again set up, and $\Delta V_T$ measured. The difference between the second differential threshold voltage and the first differential threshold voltages is an even accurate representation of the dosage which has been received.

The sensitivity of the dual IGFETs can be expressed as $\Delta V_T/D = S_1 - S_2$ which equals 0 for the case in which the gate bias equals zero, or about 2 mV/cGy for the case in which the gate bias is equal to 3 volts, or about 5 mV/cGy for the case in which the gate voltage is greater than 10 volts.

The temperature sensitivity of the dual IGFET sensor has been found to be smaller than 0.1 mV/°C. Over the military temperature range described earlier $\Delta V_T = 7mV = 1-3$ cGy, depending on bias, which is a substantial improvement over the 70 cGy of the single IGFET sensor of the prior art.

Experiments with irradiated type TN502 IGFET devices in a dual mode as described above indicate that at least for low radiation dosage, the effect of threshold voltage increases due to surface states is reduced to smaller or equal to 1 mV, which appears to be adequate for most applications in the 10–1,000 cGy range.

Figures 4, 5:
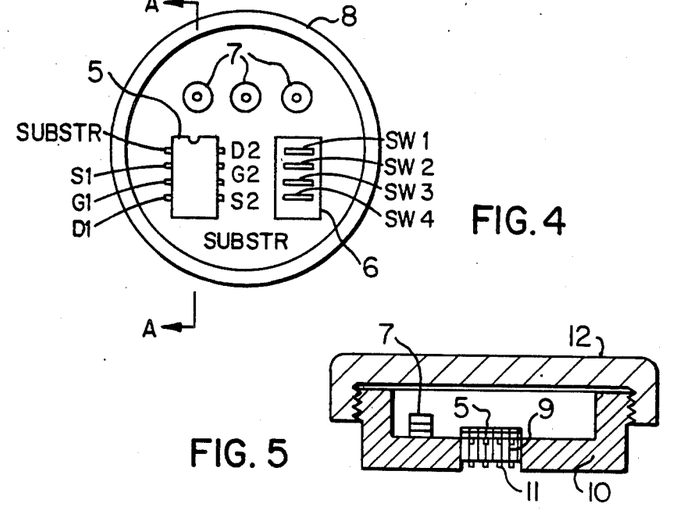
FIG. 4 is a plan view of a physical layout for implementing the present invention in a locket or badge.
FIG. 5 is section A—A of the apparatus illustrated in FIG. 4.

To fabricate a remote reading type of dosimeter, the two IGFETs can be connected in a dual in line package 5 shown in plan in FIG. 4 within a housing. Also located within the housing is a four switch minidip switch 6, and several wristwatch batteries 7. The housing can be a badge or locket 8 worn on the lapel on a person.

The designations of the terminals in the dual in line package 5 are shown, in which the gates and drains of the two IGFETs G1, D2, D1 and G2 are opposite each other in the two inner terminals of opposite sides of an eight terminal dual in line package, the source being at either one or the other end. This allows the minidip package to be removed, turned 180° and plugged back into its socket, which facilitates effective interchanging of the two IGFETS.

Such a package is shown in FIG. 5 in which the package 5 is plugged into a socket 9 which is retained within a locket base 10. The bottom of the socket 9 contains terminals 11 for connection to an external circuit. The minidip switch 6 is also retained on the base 10. Connections between the dual in line package terminals and the minidip switch are not shown, but can be fabricated by a person skilled in the art understanding this invention upon a reading of the description related to FIG. 6.

A protective cover 12 is screwed over the base, which cover is preferably plastic and may include a photon filter for stopping x-rays. The housing 10 is preferably made out of the same material as cover 12 and may also include a photon filter for x-rays.

Figure 6:
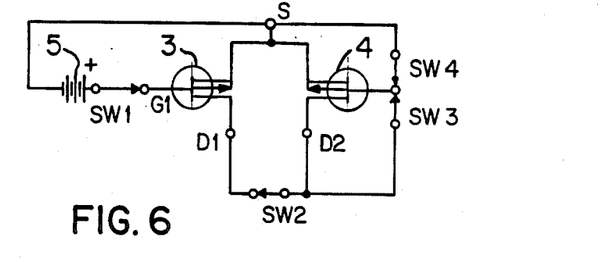
FIG. 6 is a schematic diagram of the circuit shown in FIG. 4 in its configuration prepared for accepting irradiation.

The circuit of FIG. 6 illustrates the internal connection within the base 10. IGFETs 3 and 4 have their sources connected together, the common source being connected through SW4 to the gate of IGFET 4. The drain D2 of IGFET 4 is connected to its own gate through switch SW3. Battery 5 has its positive terminal connected through switch SW1 to the gate G1 of IGFET 3, and its negative terminal connected to the source (or the common drain, if the appropriate type of IGFET is used). The two drain terminals D1 and D2 are connected together through switch SW2.

Figure 7:
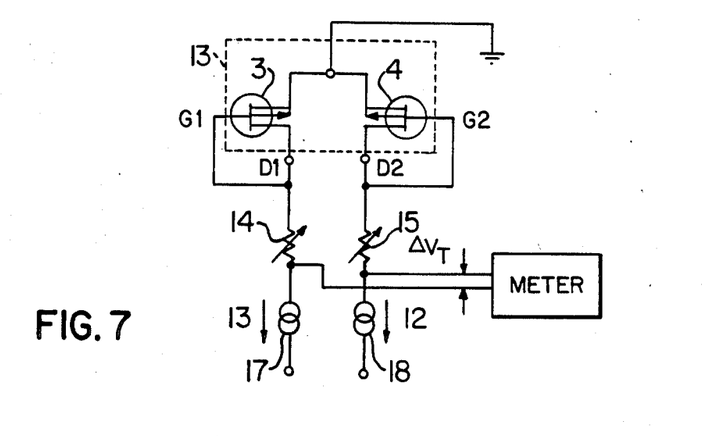
FIG. 7 is a schematic diagram of a circuit for measuring the radiation received by the sensor of FIG. 6.

Each of the switches correspond to a switch of minidip switch 6. While both IGFETs of the sensor are being irradiated, all of the switches are closed. However during reading of the dosage, all of the switches are opened. The circuit terminals are accessed through terminals 11 (FIG. 5) and the circuit of FIG. 7 is set up. The sensor IGFETs 3 and 4 with the switches open contacted at terminals 11 are as shown within the dashed box 13.

To read the dosage the common source is grounded, the gate of each IGFET is connected to its own drain, and equal sources of current $I_1$ and $I_2$ are applied, preferably through variable resistors 14 and 15 to the drains D1 and D2. Resistors 14 and 15 having been previously been adjusted to provide a null reading of $\Delta V_T$. The differential voltage between the drains D1 and D2 (which could be read on either side of the resistors), is shown $\Delta V_T$, and is read on a meter 16. A suitable range meter is 200 mV full scale to 2 volts full scale.

The circuit of FIG. 7 can of course be set up with a permanent socket so that when the dosimeter locket as shown in FIG. 6 is brought in for reading, the minidip switches are turned off and the terminals 11 at the bottom of the locket are plugged into the corresponding socket in the reading circuit. The manner of operation is preferably as follows:

Prior to irradiation, the resistors 14 and 15 are set to 0, the locket is plugged into the reading circuit so that the differential threshold voltage of the IGFETs are measured. This voltage will be found to be nearly 0. The bias voltage on transistor G1 should then be switched into the circuit as in FIG. 6, and switches SW1-SW4 closed. The meter will read the battery voltage, which can be a fundamental check that the dosimeter may operate.

The dosimeter sensor is unplugged and the IGFETs are irradiated at a distance from the reader. In order to read the dosimeter, it is again plugged into the reading circuit and the switches SW1-SW4 opened. The differential threshold voltage is again read, the dosage received during irradiation will be the latter differential threshold voltage minus the originally read differential threshold voltage.

If required, the resistors 14 and 15 can now be rezeroed. The dosimeter sensor can now be continued to be irradiated and read as before.

When the IGFET 3 has been found to run out of range, i.e. to saturate, the dual in line package is removed from its socket, turned 180°, plugged back into the same socket, and the second IGFET 4 now becomes the IGFET which has its threshold voltage increased by radiation. Thus the range of the dosimeter is effectively doubled.

Figure 8:
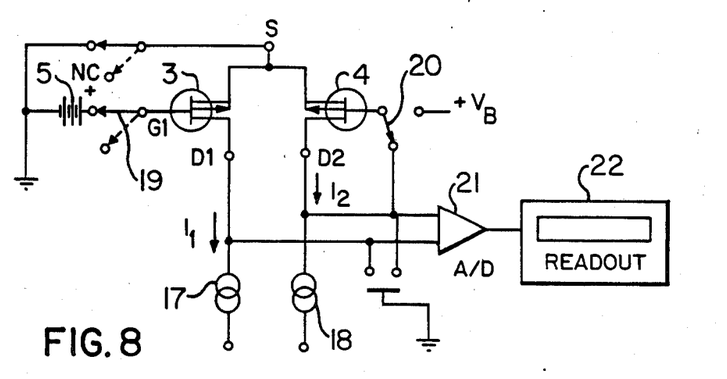
FIG. 8 is a schematic diagram of a direct reading dosimeter according to the invention.

FIG. 8 illustrates a direct reading dosimeter. In this case IGFETs 3 and 4 are connected to similar current sources 17 and 18, which pass similar currents through the source-drain circuits of IGFETs 3 and 4. The sources of the IGFETs are connected together as before. The gate of IGFET 3 is connected through single pole double throw switch 19, which has one terminal connected to the positive pole of battery 5, and its other terminal connected drain D1. The negative pole of battery 5 is also connected to ground.

The gate of IGFET 4 is connected to a switch 20 which has one pole connected to a positive battery voltage+ and its other pole to ground.

The drains of the IGFETs 3 and 4 are connected to the input of analog to digital converter 21, which has its outputs connected to the inputs of a digital readout 22. Of course the analog to digital converter 21 can be deleted and readout 22 can be an analog meter.

In order to read the differential threshold at the input of analog to digital converter 21, switches 19 and 20 are connected as shown in FIG. 8. The gate of IGFET 4 is connected through switch 20 to its own drain D1 and the gate of IGFET 3 is connected to its drain D2. Readout 22 will provide a constant accumulated dosage reading.

When IGFET 3 has been used up, i.e. saturated switch 20 is connected to the positive source +, and switch 19 is switched to D1. IGFET 4 thus becomes the sensing device.

Figure 9:
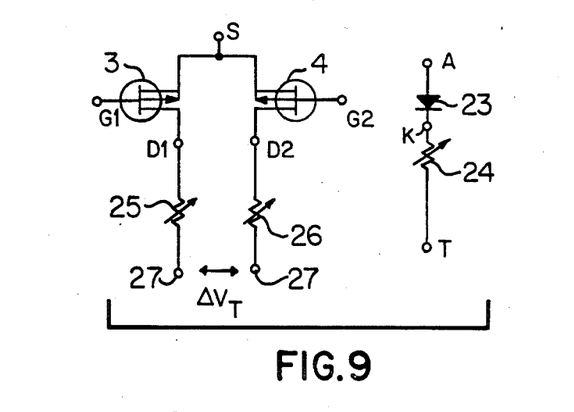
FIG. 9 is a schematic diagram of a basic sensor for measuring both gamma and neutron radiation.

The IGFETs thus far described provide a gamma dosage indication. In order to also facilitate reading of neutron dose, a PIN diode 23, having anode A and cathode K is preferably used. A variable resistor 24 is connected in series with it to provide a predetermined voltage for a given current through the PIN diode. For example if a voltage is applied across the series circuit of the PIN diode 23 and resistor 24 to provide a current of e.g. 25 mA, resistor 24 can be adjusted to provide a voltage between terminal A and terminal T of e.g. 2 volts.

Physically located to receive the same radiation as the PIN diode are IGFETs 3 and 4 as described earlier, with their sources connected together and drains connected through resistors 25 and 26. The resistors can be trimmed to provide a differential threshold voltage across terminals 27 of 0 volts.

The resistors 24, 25 and 26 can be thick film transistors on an alumina substrate, or can be thick film resistors which are laser trimmed, for example, to 0.1% tolerance and have temperature coefficients of less than 100 parts per million.

Figure 10:
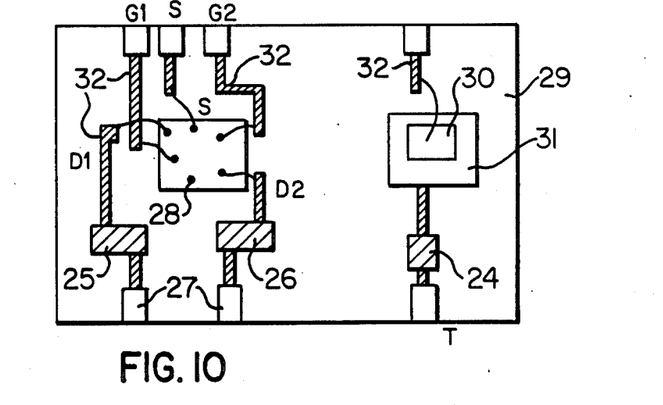
FIG. 10 is a plan view of a physical implemation of the circuit of FIG. 9.

FIG. 10 illustrates in plan view a hybrid substrate on which the components described with reference to FIG. 9 are mounted. Integrated circuit chip 28 in which IGFETs 3 and 4 are integrated is bonded to an alumina substrate 29. PIN diode 30 is bonded to a conductive layer 31 deposited on the substrate. Terminals $D_1$, S, $D_2$, A, 27, 27, and T corresponding to similarly labelled terminals of FIG. 9, are located on substrate 29. Thick film resistors 24, 25 and 26 corresponding to similarly labelled resistors in FIG. 9 are silk screened printed or otherwise deposited on the substrate, over evaporated on plated conductors 32, which are connected to the aforenoted terminals. The anode of the PIN diode and the gates, drains and common source of the IGFET chip are wire bonded to the conductors 32 to form the circuits shown in FIG. 9.

The above hybrid circuit provides a combination gamma ray neutron sensor suitable for both indirect or direct reading systems, which is also suitable for mass manufacture.

Figure 11:
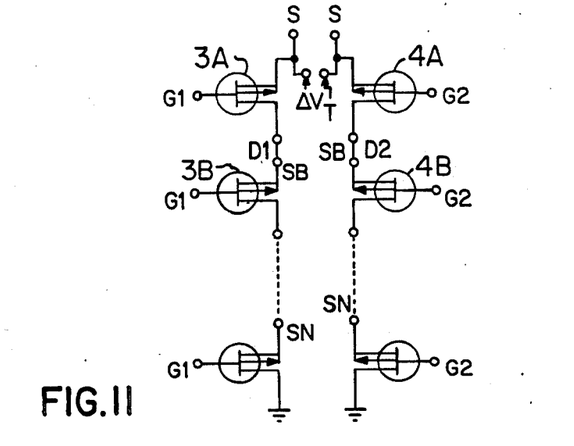
FIG. 11 is a schematic diagram of another embodiment of the sensor according to the present invention.

In another embodiment of the invention shown in FIG. 11, two groups of IGFETs 3A, 3B . . . 3N and 4A, 4B . . . 4N have their IGFETs connected in cascade within each group, the sources and drains of the cascaded transistors in each group being connected together. The drains or sources of the unconnected ends of each of the cascade of IGFETs are connected together as shown in FIG. 11, the drains being shown connected to ground. The differential voltage $V_T$ is measured between the two sources.

It will be seen that if all the gates of each of the transistors 3A, 3B . . . 3N are made positive (biased conducting) during irradiation, and all of the gates of transistors 4A, 4B . . . 4N are biased to zero, non-conducting, during irradiation, the threshold voltages of all of the transistors 3A, 3B . . . 3N increase. Since the threshold voltages of the transistors 4A, 4B . . . 4N are smaller, the sum of the changes of the threshold voltage differentials can be measured. This has been found to increase the sensitivity of the sensor without the requirement of high irradiation bias.

It will be noted that since one side of the dual IGFET sensor is at a positive bias, and the other is at zero bias, there will be a differential sensitivity to radiation, which is high enough to be of practical use. The sensitivity of a single or dual sensor is a function of bias, and the relationship of bias to sensitivity is not linear. For low bias voltages, such as used in a low voltage battery locket type instrument or low voltage direct reading instrument, the variation in gate voltage gives rise to variations in sensitivity. If the gate of one IGFET is at say, +3 V, and during irradiation the second IGFET gate is at 0 volts, the sensitivity of the first sensor is close to being linear with voltage of e.g. 0.5 mV/cGy/volt. However if the gate voltage varies from battery to battery or with temperature, then the sensitivity of the dual pair will also vary. For a 10% change in a gate voltage +3 V it has been found that there will be approximately a 0.15 mV/cGy change in sensitivity. Thus for a 10% change in bias, there will be an approximate 10% change in sensitivity.

If the sensor cannot be operated at saturation, e.g. at greater than 15 volts, then this problem is exhibited. According to an embodiment of the present invention, one method of solving this problem is to bias both sensors with a positive bias. One FET must have a high enough bias to ensure sensitivity, the other low enough to give a reasonable difference but not too low so that it reaches zero. Both sensors must be biased with the same voltage source so that as this varies the working points for each IGFETs move together.

Figure 12:
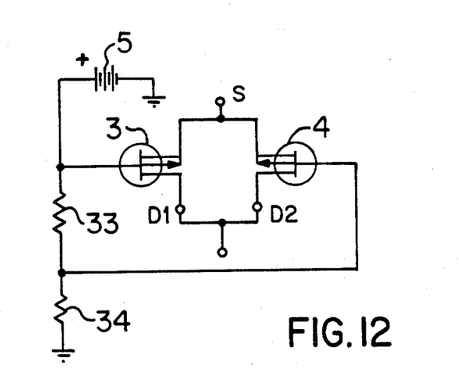
FIG. 12 is a schematic diagram of another embodiment of the sensor according to the present invention.

FIG. 12 illustrates a circuit to fulfill the requirements described above. IGFET 3 has its gate connected to the positive pole of a battery 5. The same pole of the battery is connected through a voltage divider comprised of resistors 33 and 34 connected across it. The gate of IGFET 4 is connected to the junction between the resistors. This circuit of course is set up prepared for irradiation, and thus the sources are connected together and the drains are connected together.

Figure 13:
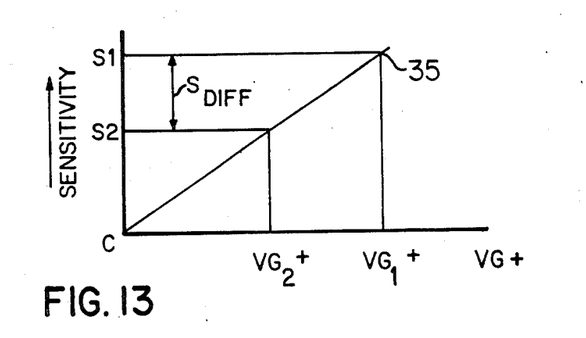
FIG. 13 is a graph of sensitivity against gate voltage of the IGFETs of FIG. 12.

FIG. 13 is a curve illustrating the sensitivity as ordinate versus gate bias $V_G+$ as abscissa. The curve is shown as line 35.

For gate voltage $V_{G1}+$, transistor 3 exhibits sensitivity $S_1$. At the same time the gate bias $V_{G2}+$ of IGFET 4 exhibits sensitivity $S_2$. The differential sensitivity $S_{DIFF}$ is the differential sensitivity.

As the battery voltage changes, it will be found that the differential sensitivity will be substantially immune to fairly large variations in battery voltage, and it will be substantially constant from locket to locket or instrument to instrument for sensors made from the same process. This occurs because the slope of the sensitivity/bias curve has been found to be more constant than the potential variations in battery voltage. This circuit has been found to be a substantial improvement over an attempt to stabilize by clamping one sensor to zero voltage during irradiation.

Figure 14:
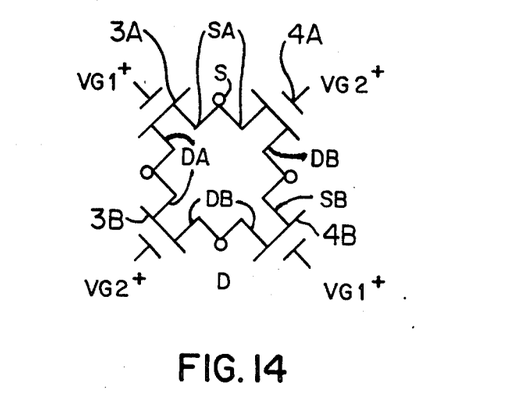
FIG. 14 is a schematic diagram of a sensor according to a further embodiment of the invention.

FIG. 14 illustrates a bridge form of sensor. This circuit is a limited form of the cascade circuit shown in FIG. 11, in which four transistors are used, two in each casecade series.

In this configuration, prepared for irradiation, the drains DB of transistors 3B and 4B are connected together to a common drain lead D, the sources SB of transistors 3B and 4B are respectively connected to drains DA and DB of transistor 3A and 4A respectively, and the sources SA of transistors 3A and 4A are connected to a common source lead S.

The gates of transistors 3A and 4B are connected to the same positive bias $V_{G1}$ and the gates of transistors 4A and 3B are connected to the same bias $V_{G2}+$ (the substrates have been omitted in this diagram for the purpose of clarity, but are all connected together).

Figure 15:
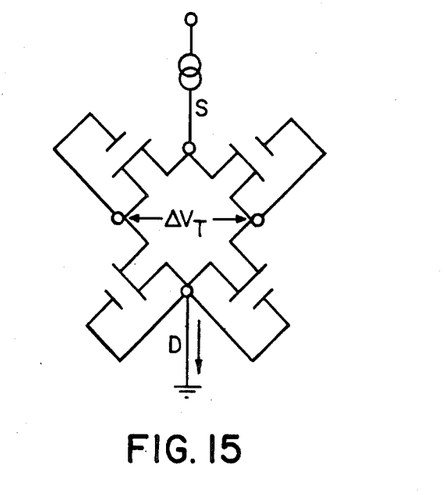
FIG. 15 is a schematic diagram of the circuit of FIG. 14 in a configuration in which dosage is to be read.

Prior to irradiation, all of the IGFETs will have nominally the same threshold voltage, so that driving the bridge with one constant current source ISD will result in a differential threshold voltage $\Delta V_T$ close to zero, as shown in FIG. 15. To read the irradiation dosage, the gates of IGFETs are connected to their respective drains. The common source S is driven from a constant current source $I_{SD}$ which is also connected to the common drain terminal D. The points DA, SB and DB, SB are the points from which the differential threshold voltage is measured. The common substrate should be connected to the most positive potential point.

Thus during irradiation, bias $V_{G1}$ and $V_{G2}$ is applied to the circuit as shown in FIG. 14. During reading of the dosage, the value $\Delta V_T$ is measured as shown in the circuit in FIG. 15. Prior to irradiation the value $\Delta V_T$ measured by the circuit shown in FIG. 15 will result in a differential threshold voltage close to zero.

During irradiation, in the circuit shown in FIG. 14, all gates are positive with respect to the substrate, which should be at ground potential. If $V_{G1}+$ is larger than $V_{G2}+$, the threshold voltages of transistors 3A and 4B will increase by a greater amount than the threshold voltages of transistors 4A and 3B, as described earlier. The threshold voltage shift $\Delta V_T$ due to irradiation will be found to be twice that of the simpler dual IGFET sensor with the same (different) gate biases during irradiation described earlier with respect to FIG. 12.

The benefit of the bridge form of the circuit is that twice the sensitivity of a two IGFET type sensor described earlier in the specification is obtained, only one current source is required for reading as opposed to two current sources required in the earlier embodiments and the same gate bias is used during irradiation as that of the dual pair described earlier.

It may thus be seen that the various embodiments of the present invention provide a substantially more sensitive, stable and accurate dosimeter sensor and dosimeter circuit than prior art MOS sensors and dosimeter circuits.

A person understanding this invention may now conceive of variations and other embodiments, all using the principles described herein. All are considered to be within the sphere and scope of the invention as defined in the claims appended hereto.

I claim:

1. A radiation dosimeter comprising a pair of silicon insulated gate field effect transistors integrated into the same substrate, each having a gate, a source, and a drain, means for measuring a first differential threshold voltage between the transistors, means for forward biasing the gate of the first transistor and inhibiting operation of the second, while allowing both to be subjected to ionizing radiation, means for measuring a second differential threshold voltage between the transistors following said irradiation, the difference between said differential threshold voltages being indicative of the radiation dosage.

2. A radiation dosimeter comprising first and second insulated gate field effect transistors integrated in the same substrate, each having a source, drain and gate, the sources being connected together, means for connecting a first voltage source positively poled toward the gate of the first transistor between its source and gate, and means connecting a second voltage source positively poled toward the gate of the second transistor between its source and gate, the second voltage source having less potential difference than that of the first voltage source, and means connecting the drains of said transistors together.

3. A dosimeter as defined in claim 2 including means for disconnecting the drains of said transistors from each other, means for disconnecting the voltage sources from the gates, means for connecting the gates to the drains of the corresponding transistors, means for applying similar currents to each source-drain circuit of each transistor, and means for reading potential difference between the drains to obtain either an accumulated radiation dose indication following irradiation or an initial differential threshold measured prior to irradiation.

4. A radiation dosimeter as defined in claim 3 including resistors connected in series with each drain, the values thereof being predetermined to render any differential threshold voltage which may be measured between the two transistors, to zero, prior to irradiation of the transistors.

5. A dosimeter as defined in claim 3 in which the potential difference of the second voltage source is zero.

6. A dosimeter as defined in claim 3 in which the potential difference of the second voltage source is a fraction of the potential difference of the first voltage source.

7. A dosimeter as defined in claim 3 in which the transistors have polysilicon gates separated from the substrate by a gate insulating layer having thickness equal to or greater than about 0.5 micron, and have a common silicon substrate.

8. A dosimeter as defined in claim 3 in which the transistors have polysilicon gates separated from the substrate by a gate insulating layer having thickness equal to or greater than about 0.5 micron, are of P-channel types, and have a common silicon substrate.

9. A dosimeter as defined in claim 2 in which the potential difference of the second voltage source is zero.

10. A dosimeter as defined in claim 2 in which the potential difference of the second voltage source is a fraction of the potential difference of the first voltage source.

11. A dosimeter as defined in claim 2 in which the transistors have polysilicon gates separated from the substrate by a gate insulating layer having thickness equal to or greater than about 0.5 micron, and have a common silicon substrate.

12. A dosimeter as define in claim 2 in which the transistors have polysilicon gates separated from the substrate by a gate insulating layer having thickness equal to or greater than about 0.5 micron, are of P-channel types, and have a common silicon substrate.

13. A radiation dosimeter comprising a first drain to source, cascade interconnection of a first plurality of insulated gate field effect transistors (IGFETs), and a second drain to source cascade interconnection of a second plurality of insulated gate field effect transistors (IGFETs) similar in number to the first, all integrated into the same substrate, means for positive biasing each of the gates of the first plurality of transistors and for biasing each of the gates of the second plurality of transistors to bias levels less than those of the first plurality of transistors, and means connecting drains of transistors at the ends of the respective cascade interconnections together.

14. A radiation dosimeter as defined in claim 13 including means connecting the sources of transistors at the other ends of the respective cascade interconnections together, means for applying a current through the cascade interconnections of the transistors, means for connecting each gate of each transistor to its own drain, and means for measuring a differential threshold of conduction between the cascade connections between corresponding drains in the cascade connections to obtain either a measure of initial threshold differential or received radiation dosage.

15. A radiation dosimeter as defined in claim 14 in which the number of transistors in each cascade interconnection is two.

16. A radiation dosimeter as defined in claim 13 in which the transistors are of P-channel type, the number of transistors in each cascade connection is two, means connecting sources of transistors at the other ends of the cascade interconnections of respective transistors together, means for applying a positive bias to first and second cascaded transistors respectively in the first and second cascaded connections and a smaller positive bias to second and first cascaded transistors respectively in the first and second cascaded connections, during irradiation of all transistors together with ionizing radiation.

17. A method of measuring ionizing radiation dosage comprising:
   (a) measuring a first differential threshold voltage between a pair of similar insulated gate field effect transistors integrated into the same substrate,
   (b) positively biasing the gate of the first transistor and inhibiting operation of the second, while allowing both to be subjected to ionizing radiation,
   (c) measuring a second differential threshold voltage between the transistors following said irradiation, and
   (d) subtracting the first from the second differential threshold voltage to obtain a measure of the radiation dosage.

18. A method as defined in claim 17 in which said substrate is silicon and in which each transistor has gate oxide $\geq 0.5$ micron in thickness.

19. A method as defined in claim 18 in which the gates of the transistors are formed of polysilicon.

20. A method as defined in claim 18 in which the gates of the transistors are formed of polysilicon, the gates have gate oxides of about 0.5 micron thickness and the transistors are of P-channel type integrated in a silicon substrate.

21. A method as defined in claim 17 in which the gates of the transistors are formed of polysilicon.

22. A method as defined in claim 17, in which the gates of the transistors are formed of polysilicon, the gates have gate oxides of about 0.5 micron thickness and the transistors are of P-channel type integrated in a silicon substrate.

23. A method of measuring radiation dosage comprising:
   (a) connecting the sources of two insulated gate field effect transistors (IGFETs), integrated in the same substrate, together,
   (b) connecting the gate of each transistor to its corresponding drain,
   (c) applying equal currents between the drains and sources of each transistor,
   (d) measuring a first voltage between the drains of the two transistors,
   (e) applying a first biasing voltage between the gate and source and drain of the first transistor, poled to positive bias the gate of the first transistor,
   (f) applying a second biasing voltage which is between zero and a level significantly less than the first biasing voltage between the gate and source and drain of the second transistor, poled to zero bias or positive bias the gate of the second transistor,
   (g) connecting the drains of the transistors together,
   (h) allowing both transistors to be subjected to ionizing radiation,
   (i) removing the application of first and second biasing voltage and disconnecting the drains from each other,
   (j) repeating steps (b), (c), and (d) but this time in step (d) measuring a second voltage between the drains of the transistor, and
   (k) subtracting the initially measured voltage of step (d) from the subsequently measured voltage of step (d) to obtain a measure of the radiation dosage recorded by the first transistor.

24. A method as defined in claim 23 in which the gates of the transistors are formed of polysilicon, the gates have gate oxides of about 0.5 micron thickness and the transistors are of P-channel type integrated in a silicon substrate.

* * * * *